(12) United States Patent
Hasty et al.

(10) Patent No.: US 7,344,430 B2
(45) Date of Patent: Mar. 18, 2008

(54) REMOTE/OCCUPANT CONTROLLED TOY VEHICLE

(76) Inventors: Christopher M. Hasty, 1431 Maryanne Ave., Tifton, GA (US) 31794; Alan G. Sanders, 71 Buckfast Ct., Thomasville, GA (US) 31792

( * ) Notice: Subject to any disclaimer, the term of this patent is extended or adjusted under 35 U.S.C. 154(b) by 0 days.

(21) Appl. No.: 11/127,239

(22) Filed: May 12, 2005

(65) Prior Publication Data
US 2006/0254839 A1 Nov. 16, 2006

(51) Int. Cl.
A63H 30/04 (2006.01)
B60T 7/16 (2006.01)
B62D 1/24 (2006.01)
B60K 1/00 (2006.01)

(52) U.S. Cl. ........................ 446/456; 180/167; 180/65.1
(58) Field of Classification Search ................ 446/431, 446/440, 454–457; 280/93.502; 180/167, 180/430, 65.1, 908, 169
See application file for complete search history.

(56) References Cited

U.S. PATENT DOCUMENTS 5,307,890 A * 5/1994 Huang ....................... 180/65.1
5,439,071 A * 8/1995 Rodriguez-Ferre .......... 180/167
5,816,352 A * 10/1998 Hacker ....................... 180/167
5,994,853 A * 11/1999 Ribbe ........................... 318/16
6,422,330 B1 * 7/2002 Harris ........................ 180/65.1
6,771,034 B2 * 8/2004 Reile et al. .................. 318/139
6,915,871 B2 * 7/2005 Gavish et al. .............. 180/167
2002/0121395 A1 * 9/2002 Norman et al. ............. 180/65.1

* cited by examiner

Primary Examiner—Eugene Kim
Assistant Examiner—Alyssa M Hylinski
(74) Attorney, Agent, or Firm—Intellectual Property Law Firm of R. J. Lasker, Esq.

(57) ABSTRACT

An operation control system for an electrically powered and remotely controlled vehicle to be occupied by a child with a steering mechanism to be engaged and disengaged for either local or remote control. A remote control device for selectively controlling the direction and speed of the vehicle. A remote control receiver in the vehicle for receiving control signals from the remote control device and generating steering mechanism and speed control signals. A drive motor for driving the wheels of the vehicle and responsive to the speed control signals; and a steering motor for controlling the direction of movement of the vehicle and responsive to the steering mechanism control signals.

3 Claims, 5 Drawing Sheets

REMOTE/OCCUPANT CONTROLLED TOY VEHICLE

BACKGROUND OF THE INVENTION

1. Field of the Invention

This invention relates to wheeled vehicles operated as toys for and by children with adult control and supervision and more particularly to such vehicles which are powered by an electrical power source having a wireless system for controlling the operation of the electrical vehicle which is occupied by a child occupant, thereby providing remote control by an adult, and which may be easily modified to enable the steering mechanism and motor control to enable the child occupant to drive the vehicle independent of the remote control system. Thus, this invention is distinguishable from those electrically operated and controlled toys that do not have a child as the occupant of the electrically operated vehicle.

2. Related Art

Electrically powered vehicles controlled remotely from a wireless controller are of course known to those skilled in the art to which this invention pertains. Similarly, vehicles that are driven by a mature child are also known to the art. This invention combines the art of wireless electronic control of non child-occupied toy vehicles with that of electrically powered vehicles that can be directly operated by a mature child.

SUMMARY OF THE INVENTION

This invention was originally designed for children between, for example, the ages of 1 and 3 years of age who are active and enjoy riding on toy vehicles but often lack the situational awareness and motor control that is needed for complete independent activity. By providing a direct means of parental/adult control, children and parents alike can enjoy this invention together.

The electrically powered and wireless controlled vehicle for children in accordance with the invention can be remotely controlled by an adult with the child occupying the vehicle. There are numerous products on the market for children old enough and responsible enough to drive an electric vehicle under adult supervision. The inventors have demonstrated that it is possible for a younger child to enjoy riding in an electrically powered vehicle while the parent or adult is in actual remote control of the vehicle. After the child reaches a suitable age, the electric vehicle of the invention can be easily converted to allow the child to independently control and operate the vehicle.

A rechargeable battery is used to provide power for forward and reverse motion of the vehicle. A separate battery pack is used to provide wireless directional control and also to govern forward and reverse motion of the vehicle. In this manner, if the battery that provides power for the drive motor of the vehicle were to become discharged, then radio control is still available and the vehicle will still operate, although at reduced speeds. A device that regulates the radio control power requirements and signal requirements is utilized. If the radio receiver loses the signal from the transmitter held by the adult, the vehicle stops. Moreover, if battery power for the radio control were to drop too low, then the vehicle will also cease to function.

The electrical vehicle of the invention also has both forward and reverse speeds that can be controlled remotely by the adult. In switching from forward to reverse, there is an automatic delay so that the vehicle cannot change from forward to reverse too suddenly. Incorporated into the vehicle is a five point harness for child restraint. This invention requires direct adult control and not just adult supervision. When combined with the onboard safety features, the product represents a safe toy vehicle that young children (and parents alike) can both enjoy.

The invention also contemplates a control system that allows radio control retrofit to existing owners of such vehicles.

BRIEF DESCRIPTION OF THE DAWINGS

The above objects, advantages and features of the invention are readily apparent from the following description of a preferred embodiment of the best mode of carrying out the invention when taken in conjunction with the following drawings, wherein.

DETAILED DESCRIPTION OF THE INVENTION

Figure 1:
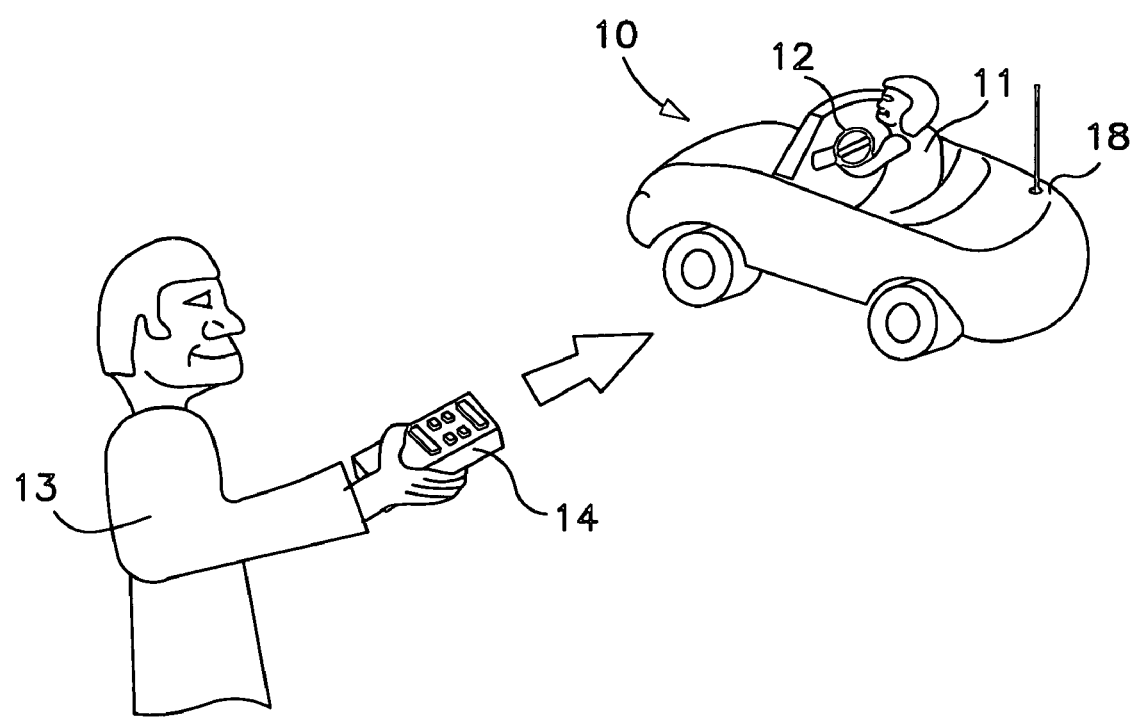
FIG. 1 is a perspective view of the electrically powered vehicle occupied by a child and remotely controlled by a supervising adult from a distance.

FIG. 1 shows a perspective view of the electrically powered and remotely controlled vehicle 10 occupied by a child 11 grasping the steering wheel 12 and remotely controlled by an adult 13 using a wireless transmission control device 14. The invention is adaptable to virtually any toy vehicle that is capable of being occupied by a child and that has a steering wheel and electrical motive power for driving the toy vehicle by both remote and non remote control.

Figure 2:
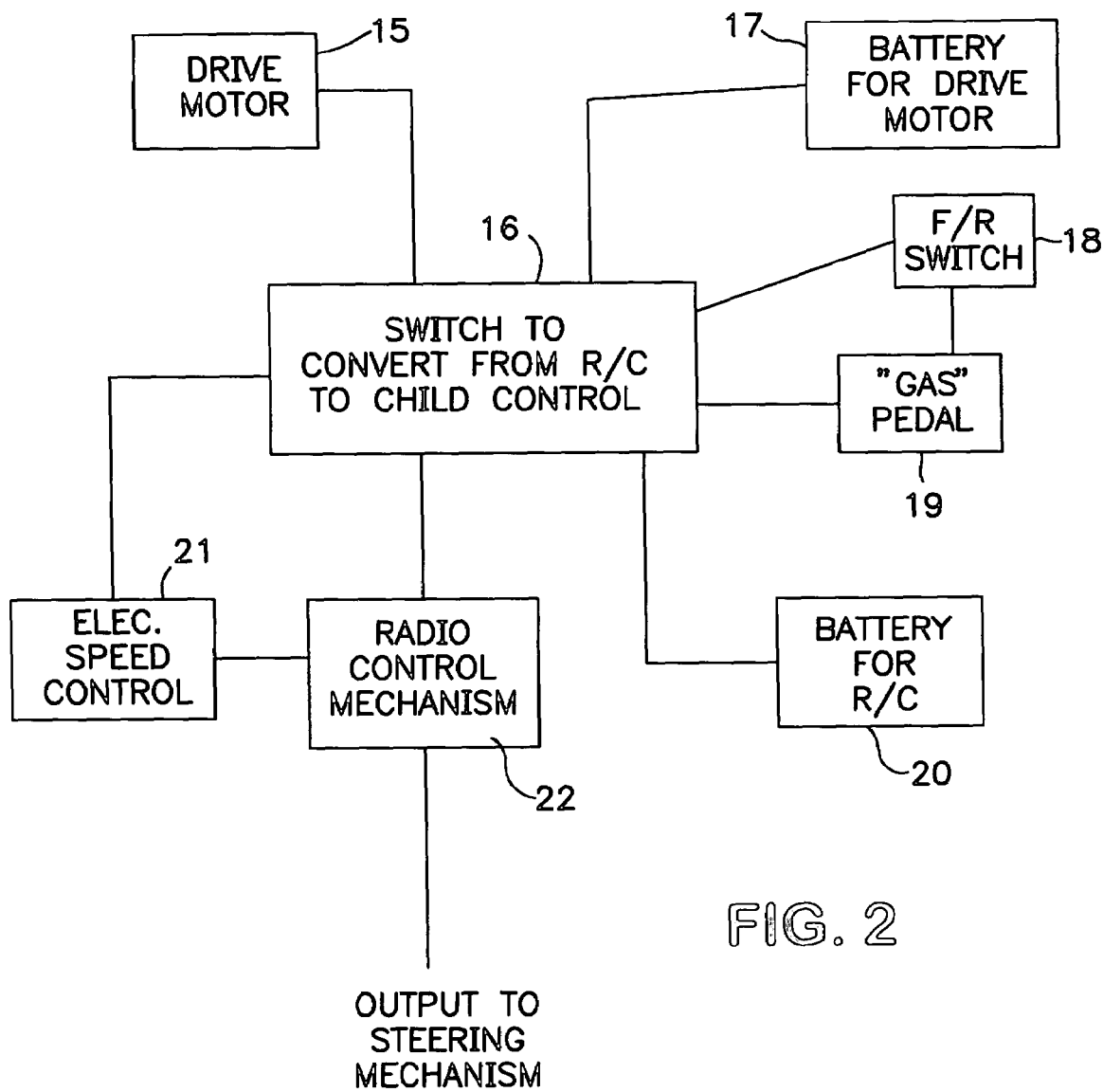
FIG. 2 is a schematic block diagram of the operating and control system according to the invention.

The operating and control system shown in FIG. 2 illustrates electrical powered drive motor 15 connected to a switch 16 for converting operation of the control system from remote control (R/C) to child control. Battery 17 provides power for the electrical powered drive motor 15 of the electrically powered vehicle 10; F/R switch 18 controls the forward and reverse motion of the vehicle while not under remote control; and "gas pedal" 19 mechanically controls the speed of motion of the vehicle. Battery 20 provides electrical power for remote control operation of the vehicle control system. The electrical speed control device 21 provides remote control of the speed of the vehicle from a remote control receiver 22 which provides an output to the steering mechanism of the toy vehicle. A rheostat type speed control may be employed to effectuate forward and reverse motion of the toy vehicle.

Figure 3:
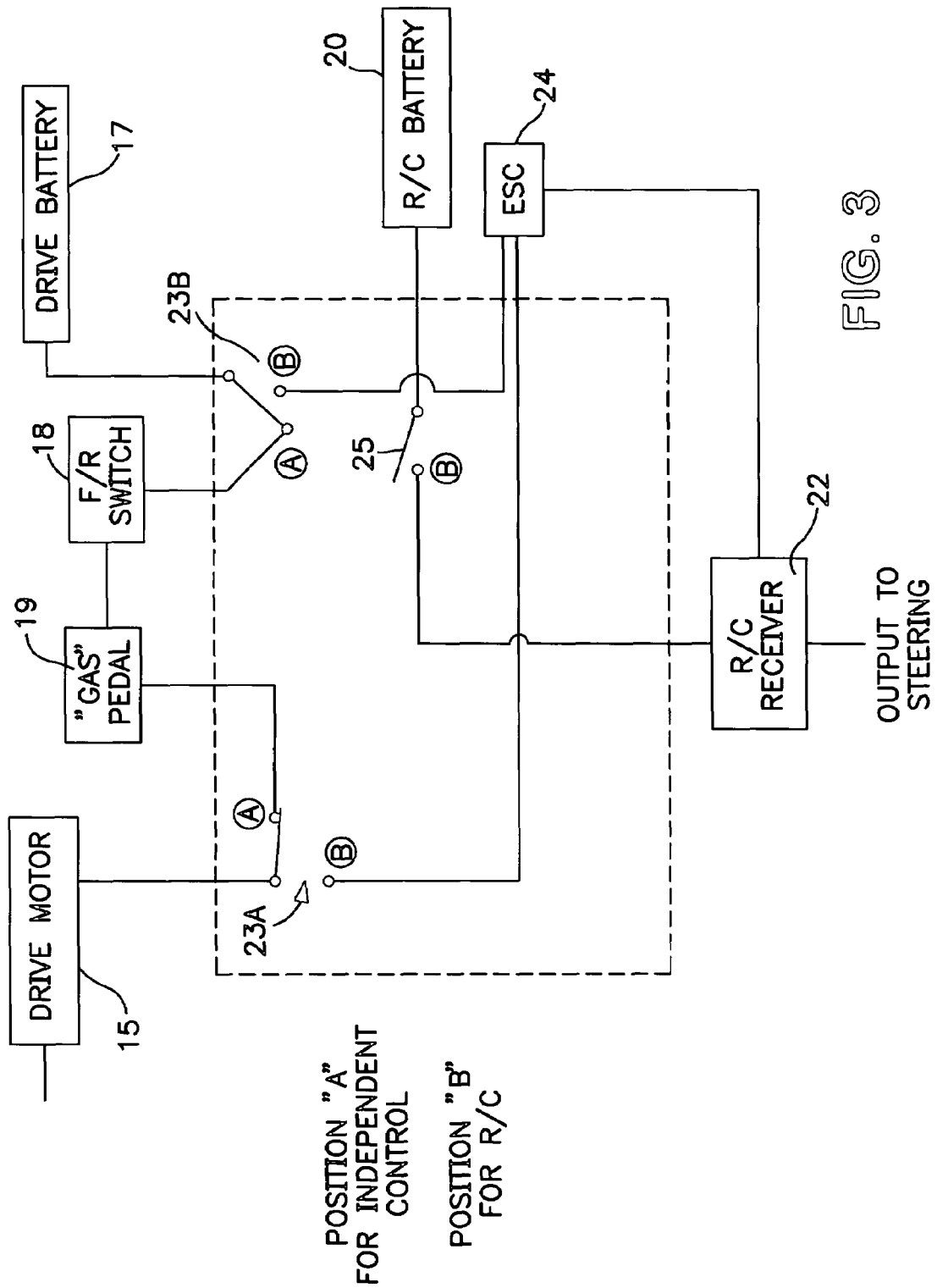
FIG. 3 is a block diagram representation of the master switch in the control system of the electrical vehicle in accordance with the invention.

FIG. 3 shows a preferred embodiment of the detailed structure of switch 16 in FIG. 2 and wherein a first section of ganged switch 23A interconnects drive motor 15 with either the "gas pedal" 19 or a circuit 24 (ESC) and a second section of switch 23B connects drive battery 17 to either forward reverse switch 18 or electronic speed control switch (ESC) 24. These switches positions are respectively represented by positions A and B in FIG. 3. Finally switch 25 connects/disconnects the remote control battery 20 to remote control receiver 22. The operations of switches 23A and 23B are ganged as illustrated in FIG. 3 so that the A-A and B-B positions of the switches are operated simultaneously. The A-A position provides independent control of the toy vehicle and the B-B position provides remote control of the toy vehicle.

Figure 4:
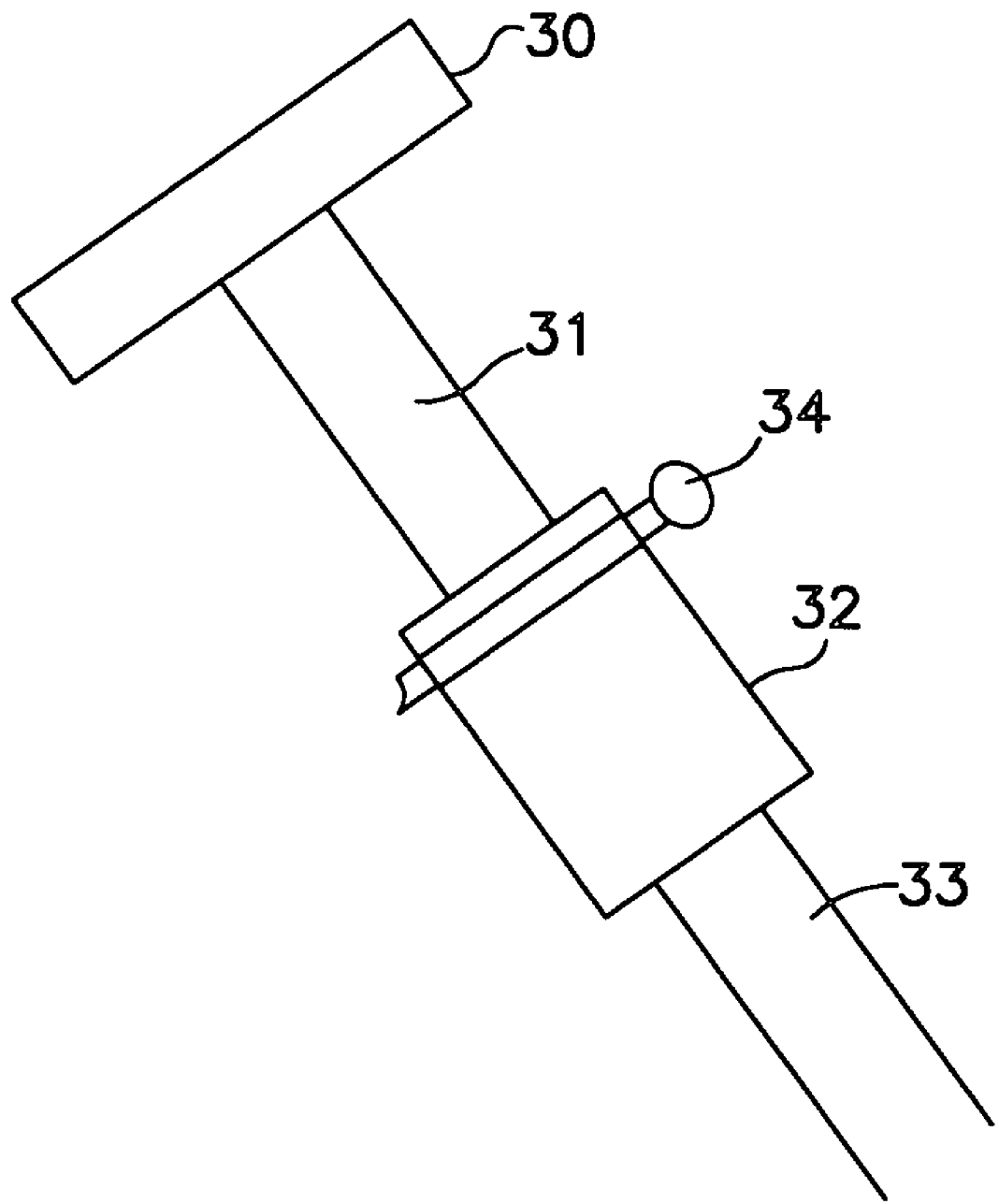
FIG. 4 illustrates a portion of the steering wheel mechanism and a steering disconnect arrangement in accordance with the invention.

The steering wheel disconnect mechanism illustrated in FIG. 4 enables the steering mechanism to be operated or not be operated by the child in the vehicle. The steering wheel 30 is connected by shaft 31 to coupler mechanism 32 and then through another shaft 33 to the steering mechanism for the wheels. The steering wheel 30 is disengaged by removal of hitch pin 34 which allows the child to turn the steering wheel without affecting directional movement of the vehicle while it is under remote control. With hitch pin 34 inserted as shown in FIG. 4, the child is allowed to control directional movement of the vehicle. An electromagnetic type steering mechanism can be employed in the steering mechanism described above.

Figure 5A:
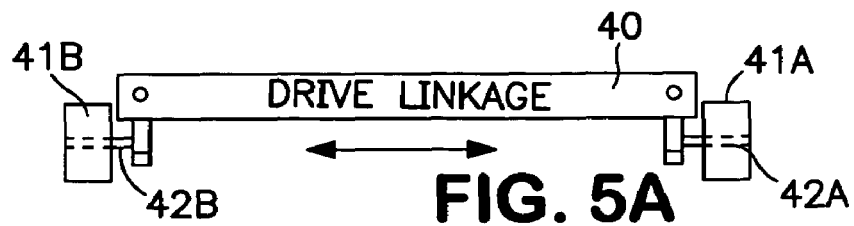
FIG. 5A illustrates a simplified representation of the drive linkage mechanism in the electrical vehicle in accordance with the invention.

The drive linkage 40 illustrated in FIG. 5A interconnects opposing tires 41A and 41B via respective drive spindles 42A and 42B as is known to the art.

Figure 5B:
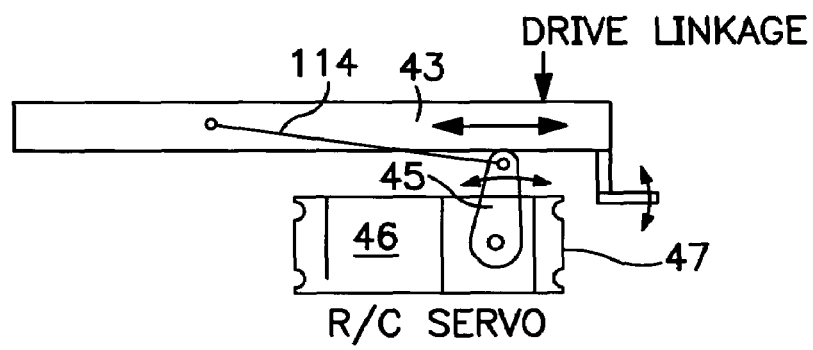
FIG. 5B illustrates one embodiment of a steering mechanism used in the invention.

FIG. 5B illustrates one embodiment of a steering mechanism for steering the electrical vehicle of the invention wherein drive linkage 43 is connected by connecting rod 44 to a movable drive cam 45 with drive cam 45 being actuated by remote controlled servo motor 46 which receives control signals from remote control receiver (FIG. 3).

Figure 5C:
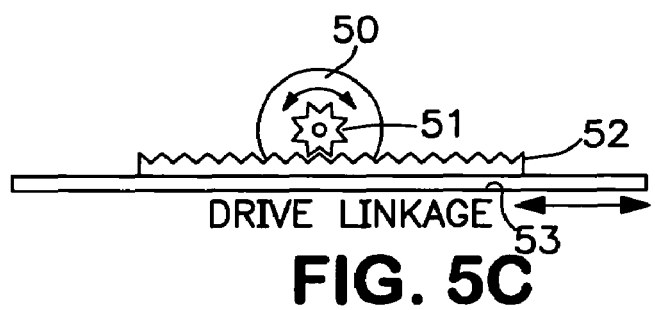
FIG. 5C illustrates a second embodiment of a steering mechanism used in the invention.

FIG. 5C illustrates another embodiment of a steering mechanism for steering the electrical toy vehicle of the invention and using a reciprocating motor 50 with an attached gear 51 engaged with gear 52 fixed to drive linkage mechanism 53.

Figure 5D:
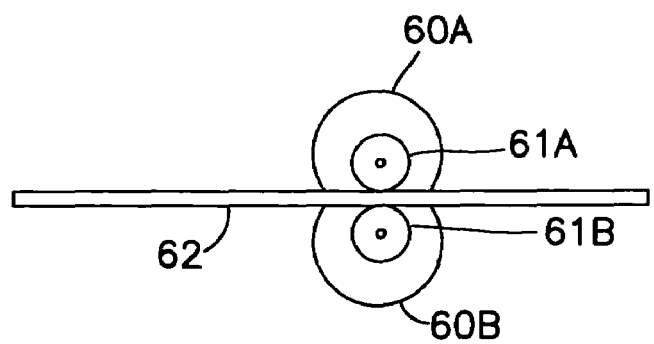
FIG. 5D illustrates yet another embodiment of a steering mechanism used in the invention.

Finally, a further embodiment of a steering mechanism for steering the electrical toy vehicle of the invention as shown in FIG. 5D and uses a pair of spaced motors 60A and 60B with respective attached rubber wheels 61A and 61B to engage drive linkage 62 sandwiched between rubber wheels 61A and 61B.

The above description serves only to describe exemplary embodiments of the best node of making the electrically powered and remotely controlled child occupied vehicle to demonstrate its construction and operation. Thus, the invention is not intended to be limited thereby, as those skilled in the remotely controlled and electrically actuated vehicle are will recognize modifications of the embodiments of the invention described herein. The invention is intended to be limited only by the following claims and the equivalents to which the claimed components are entitled.

What is claimed is:

1. An operation control system for an electrically powered vehicle for both remote and non-remote operation and occupied by a child, comprising:
   a.) a steering mechanism to be engaged and disengaged for either local or remote control;
   b.) a remote control device for selectively controlling the direction and speed of the vehicle;
   c.) a remote control receiver in said vehicle for receiving control signals from said remote control device and generating steering mechanism and speed control signals;
   d.) a remote control battery for energizing said remote control receiver;
   e.) a drive motor for driving the wheels of said vehicle and responsive to said speed control signals;
   f.) a speed control switch for controlling the speed of the vehicle;
   g.) a gas pedal for controlling the speed of said vehicle independent of said speed control switch;
   h.) a steering motor for controlling the direction of movement of said vehicle and responsive to said steering mechanism control signals;
   i.) further comprising switching means for providing either (1) independent control of said vehicle, whereby the child controls the vehicle operation in- dependent of remote control of said vehicle, and (2) remote control of the vehicle, whereby control of the vehicle operation is completely independent of the child occupant; and
   j.) said switching means comprising first and second two-way switches each having respective ganged first and second terminals and a common terminal, the common terminal of said first two-way switch is connected to said drive motor and said first and second terminals of said first two-way switch are respectively connected to said gas pedal and said speed control switch; the common terminal of said second two-way switch is connected to said drive battery and the first and second terminals of said second two-way switch are respectively connected to a forward reverse switch and said speed control; the independent control switch of said vehicle is obtained with the movable contact of said first and second switches respectively contacting said gas pedal and said forward reverse switch and the remote control of said vehicle is obtained with the movable contact of said first and second switches respectively contacting said speed control switch.

2. An operational control system as claimed in claim 1, further comprising an electrical battery for providing power for driving said vehicle and a battery for operating said remote control device.

3. An operational control system as claimed in claim 1, wherein said steering mechanism further comprising means for decoupling or coupling the steering shaft with the steering mechanism and the steering wheel to prevent control of the steering mechanism by the steering wheel.

* * * * *